Figure 1:
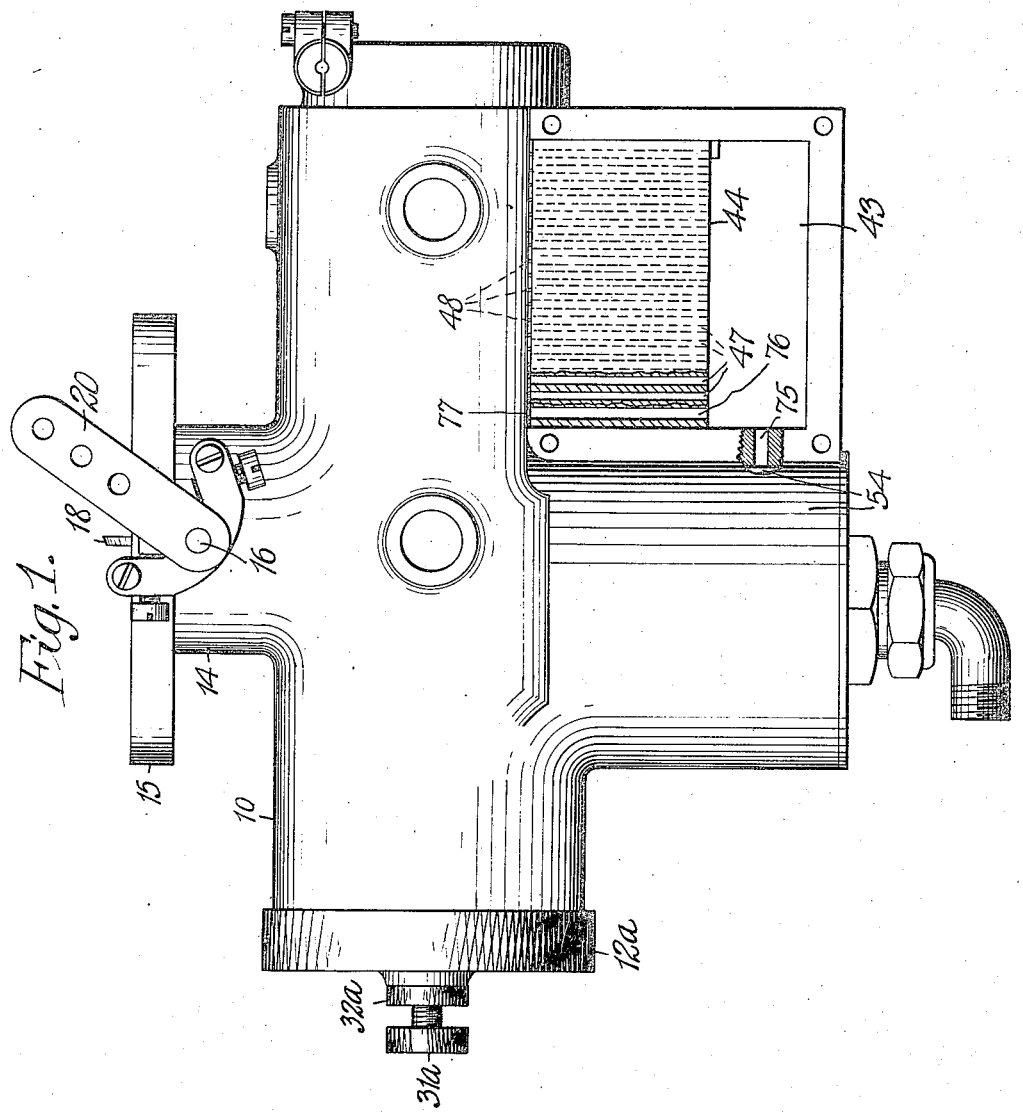

W. G. FINCH.
CARBURETER.
APPLICATION FILED DEC. 7, 1911.

1,185,492.

Patented May 30, 1916.
2 SHEETS—SHEET 1.

Witnesses:
Robert F. Bracke
Leonard W. Novander.

Inventor
Willis G. Finch
By Brown Williams
Attorneys

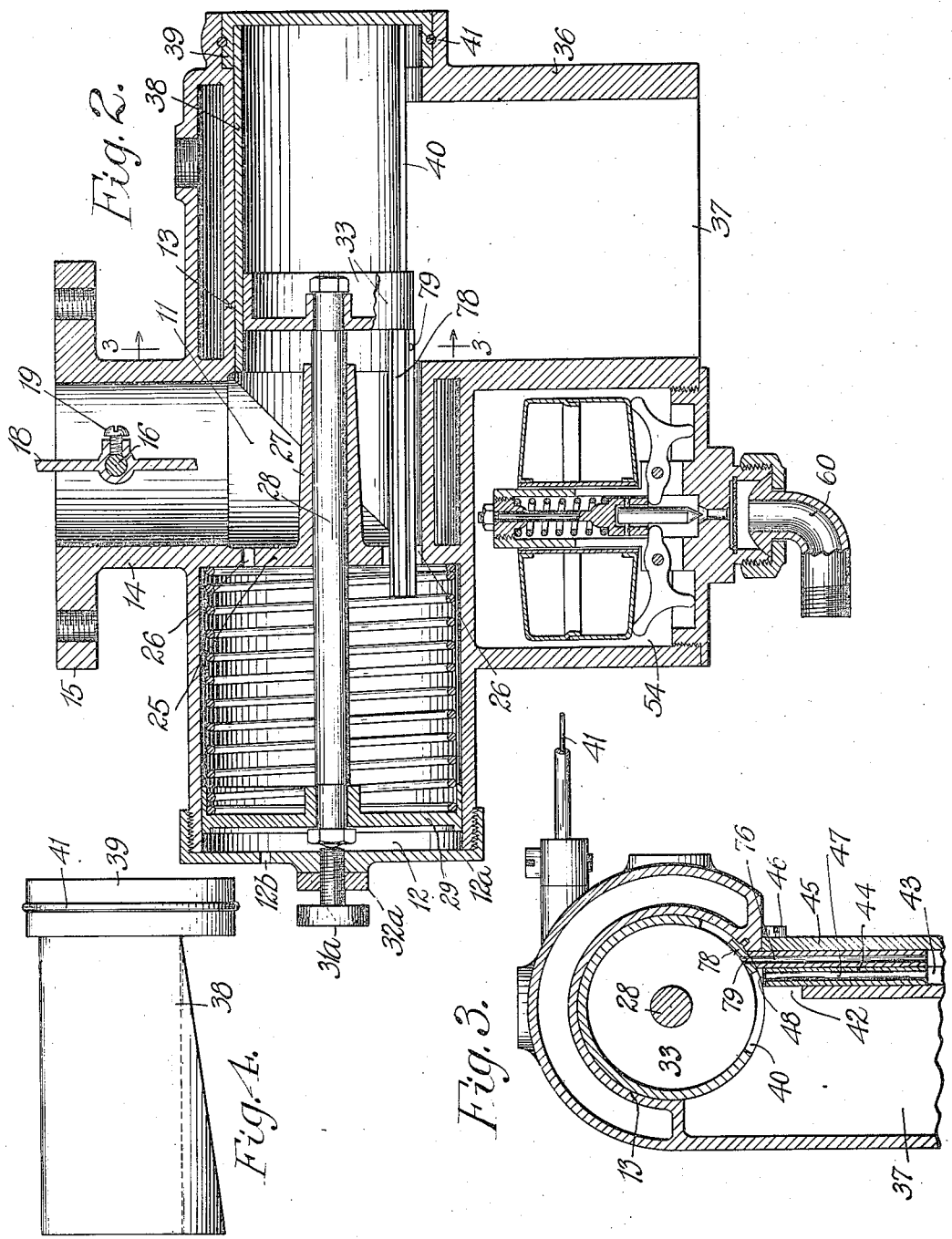

UNITED STATES PATENT OFFICE.

WILLIS G. FINCH, OF HINSDALE, ILLINOIS, ASSIGNOR TO STROMBERG MOTOR DEVICES COMPANY, OF CHICAGO, ILLINOIS, A CORPORATION OF ILLINOIS.

CARBURETER.

1,185,492.　　　　　Specification of Letters Patent.　　Patented May 30, 1916.

Application filed December 7, 1911. Serial No. 664,470.

*To all whom it may concern:*

Be it known that I, WILLIS G. FINCH, a citizen of the United States, residing at Hinsdale, in the county of Dupage and State of Illinois, have invented certain new and useful Improvements in Carbureters, of which the following is a full, clear, concise, and exact description, reference being had to the accompanying drawings, forming a part of this specification.

My invention relates to carbureters and is concerned with an arrangement for controlling and maintaining the proper constituent proportions of the combustible mixture. I may state, first of all, that the carbureter with which my invention has to do is of that type which adjusts itself automatically with the demand which the engine, with which it is associated, makes upon it.

The carbureter of my invention is particularly useful as part of the power plant of an automobile, and broadly it may be referred to as "semi-automatic" in operation. It is to be pointed out that the manual control is for the purpose of varying the amount of air which is to be mixed with a given amount of fuel, while the automatic control varies not only the amount of air but also the amount of fuel which is drawn into the carbureting chamber.

Broadly, the carbureter of my invention comprises a carbureting chamber with an air inlet and a plurality of fuel inlets associated with the air inlet. A valve determines the amount of air which may enter to the mixing chamber and at the same time the number of fuel inlets which are brought into action. This valve is connected with a sensitive part which responds to the suction of the engine and in this way, the operation of the valve is automatic. A second valve controls the amount of air which enters the mixing chamber relative to a definite number of fuel inlets. This is the valve which is operated manually and which controls the richness of the mixture according to the judgment of the operator.

Consistent with the broad purposes of my invention, I provide means for obtaining a rich starting mixture. In order to do this, in a carbureter of the type to which my invention relates, it is necessary to take several considerations into account. As before stated, there is an automatic valve which simultaneously varies the number of effective fuel inlets and the size of the air inlet so that the increase in the amount of fuel entering the carbureting chamber may be accomplished by a corresponding increase in the amount of air. If a large starting nozzle were provided, the engine might start properly, but the desired relation between the amount of fuel and the amount of air, as the engine increases in speed, would be entirely upset unless further provisions were made.

It is a feature of my invention that I provide means not only for varying the amount of air simultaneously with the amount of fuel, but for securing these variations at a different rate so that at high speeds a leaner mixture is automatically secured, the point being that as the speed of the engine increases, the amount of air in proportion to the fuel also increases.

It is a feature of my invention that the starting is secured by an auxiliary arrangement so that it will not interfere with the subsequent operation of the effective parts during the regular running of the engine. I provide for starting by means of a special starting nozzle, which is larger than the other nozzles and which is normally open to the carbureting chamber. When the engine is turned over a great amount of fuel is drawn past this nozzle and this nozzle alone, and a very rich starting mixture is the result. As the engine speeds up, however, the automatic valve operates to shut off the auxiliary nozzle and from then on the other fuel jets, which are a part of the regular varying arrangement, are brought into play. I provide the means for automatically securing a leaner mixture at high speeds by forming the manual valve in a special way and I have found by experiment that when the valve is formed in this way manual adjustment is necessary only in exceptional cases.

My invention is embodied in the device illustrated in the accompanying drawings, in which—

Figure 1 is a side elevational view of the carbureter, parts being removed and broken away and shown in section in various planes to clearly reveal the construction, Fig. 2 is a sectional view taken on the vertical axial plane of the device, Fig. 3 is a cross-sectional view taken on the plane of the line 3—3 of Fig. 2 and looking in the direction indicated by the arrows, and Fig. 4 is an elevational view of the manual valve isolated from the other parts.

Like reference characters are applied to the same parts throughout the various figures.

The main frame work of the carbureter itself is in the form of a general cylindrical body 10 which provides a carbureting chamber 11, a sensitive piston chamber 12, and a valve piston chamber 13, the cylinders extending in opposite directions from the carbureting chamber, in axial alinement therewith and with each other. The carbureting chamber 11 has the upwardly extending outlet pipe 14 which is provided with a flange 15 to facilitate its attachment to the piping which leads to the engine. A rock shaft 16 extends diametrically across the outlet pipe 14 and carries the throttle valve 18, which is secured thereon in any desired position by means of a set screw 19. The shaft 16 is provided with an operating lever 20 rigidly mounted thereon. This operating lever is connected by means of suitable linkages with actuating mechanism located conveniently for manipulation by the operator.

The sensitive piston cylinder 12 is separated from the carbureting chamber 11 by means of a wall 25 which has the apertures 26 providing for pneumatic action between the carbureting chamber and this cylinder. The wall 25 carries an elongated boss 27 which has a longitudinal bore in axial alinement with the cylinders 12 and 13. A rod 28 is mounted to slide with a bearing fit in this boss as best illustrated in Fig. 2, this rod being of such length that it extends into both cylinders 12 and 13. Within the cylinder 12, the rod 28 is provided with a piston disk 29. At the other end of the rod 28, in the cylinder 13, I provide a second piston disk 33, similar in form to the piston disk 29, but correspondingly smaller. In order to distinguish definitely between the two piston disks, I shall refer to the disk 29 as the "sensitive piston" since it responds to the suction in the associated carbureting chamber, and to the disk 33 as the "valve piston" because it controls the air and fuel inlets.

It will be seen from the drawings that the cylinder 13 is supplemented by a box 36 which is substituted for substantially one-quarter of the peripheral area of the cylinder. The interior of this box connects directly with the interior of the cylinder 13 in this way and is also exposed directly to the atmosphere as indicated at 37. This is the air inlet for the carbureter. It will be seen that there is a considerable space between the periphery of the valve piston 33 and the inside surface of the cylinder 13. A shell or sleeve 38 occupies this space, fitting snugly within the cylinder and extending the entire length thereof as clearly shown in Fig. 2. This sleeve is shown in detail in Fig. 4 and it will be seen that a portion is cut out, so as to leave an opening 40, and carries a head 39 which closes the end of the cylinder 13. It is through this opening 40 that the interior of the cylinder 13 and the interior of the box 36 are in communication. The opening 40 in the sleeve 38 has approximately the same size as the opening between the box 36 and the cylinder 13, but it will be apparent that if the sleeve is turned it acts as a valve to cut down this opening as clearly shown in Fig. 3. The head 39 is provided with a wire 41 which leads to any suitable sort of operating mechanism convenient in position to the operator. He may thus vary at will the size of the air inlet and within ample range make any desired adjustment. It will be noted that one edge of the shell 38 is parallel to the axis while the other edge is oblique thereto. The purpose of this arrangement will be described presently.

One wall of the box 36 is cut away as indicated at 42 and a pocket on the outside of the wall is provided for the reception of the fuel nozzle block 44. This nozzle block is conveniently held in place by means of the cover plate 45 secured over the pocket 43 by means of screws 46, 46, thus forming a well with which the fuel supply has communication, as will be pointed out presently. The fuel nozzle block 44 is clearly illustrated in Figs. 1 and 3, and it will be seen that it is a simple prismatic member having a plurality of passageways 47, 47 which lead upwardly from the bottom and nearly through at the top. These passageways are arranged in a plane parallel with the axis of the cylinders and they are each provided with a restricted outlet 48 which is exposed to the inside of the cylinder 13 through the cut away part 42 hereinbefore mentioned. Thus there is a series of fuel nozzles disposed in a line at the air inlet so that the air passing by may draw fuel therefrom by suction as will be described fully later.

It will be seen that the piston 33 may move parallel to and closely along the line of the fuel nozzles and that such operation simultaneously controls the air inlet. The cylinder 12 is closed by a cap 12$^a$ and a light helical spring is disposed between the sensitive piston 29 and the wall 25 and tends to keep this piston at its left hand position (Fig. 2). The extreme position is determined an adjusting screw 31$^a$ carried in the cap 12$^a$ and locked by means of a nut 32$^a$. The cover 12$^a$ has an aperture 12$^b$ which is there to admit the atmosphere.

At the side of the box 36, the float chamber 54 is provided. The passageway 60 connects with the source of fuel, and the float chamber is connected with the well 43 by means of a passageway 75. As the oil in the float chamber becomes depleted the float will gradually lower and allow more oil to enter and thus a constant supply is maintained. My invention is not concerned with the details of this float arrangement and I shall therefore refrain from burdening this specification with a specific description of it.

It will be seen that at the left hand end (Fig. 1) of the fuel block 44, a larger passageway 76, having a larger outlet 77, is provided. This is the starting nozzle. And it will be seen that it is adapted to admit considerably more fuel in a given time than the other nozzles of the set. It will also be seen that the valve piston 33 carries a valve plate 78 which, as clearly shown in Fig. 3, rests upon the top of the auxiliary nozzle. This valve plate has an opening 79 which, when the parts are abnormal, is adapted to register with the special passageway 76. So, under such conditions, this large passageway capable of supplying a suitable amount of fuel in a short time, is exposed to the carbureting chamber and is the only fuel nozzle exposed at that time. When the engine is started, therefore, it is supplied with this rich mixture, and it is not until after the engine has started that the valve is moved over, as will be understood presently, so as to close this auxiliary or starting nozzle and it can be closed during all the other movement of the valve.

It will be understood that the space on the right side of the valve piston is dead space since it does not lead anywhere, while the space on the left side is "live" since it leads to the carbureting chamber and thence to the engine. Therefore, the amount of air which is supplied to the carbureter, is increased as the valve piston moves to the right. It is highly important that it is only those fuel nozzles which are exposed to the live space that will respond by fitting therein. This since the draft is only at the live space and since the required suction is created alone by this draft. Thus, as the valve piston 33 moves to the right, not only is the air inlet increased, but the number of active fuel inlets is increased. In other words, as the piston valve moves to the right more fuel inlets are brought into play and simultaneously the volume of air admitted is increased. It has been found by experiment that the best results are obtained when the mixture is leaner at high speeds and in order that the mixture may become gradually leaner as the speed of the engine increases, I cut the edge of the shell valve 38 oblique to the axis, as clearly illustrated in Fig. 4. It will thus appear that as the piston valve moves to the right, the amount of air varies at a rate a little faster than if the edge of the valve were cut straight and in this way the amount of air in proportion to the fuel is gradually increased as the speed of the engine is increased. As before pointed out, the starting nozzle is closed just after the engine is started and the regular proportion between the amount of fuel and air is taken care of alone by the movement of the piston.

I claim as new and desire to secure by Letters Patent:

1. In a carbureter, a plurality of fuel inlets, an air inlet, a valve for simultaneously varying the number of effective fuel inlets and the size of the air inlet, an auxiliary fuel inlet for starting purposes, and means for closing said auxiliary inlet after the valve has moved a predetermined distance.

2. In a carbureter, a plurality of fuel inlets, an air inlet, a valve for simultaneously varying the number of effective fuel inlets and the size of the air inlet, an auxiliary fuel inlet for starting purposes, and means carried by said valve for closing said auxiliary inlet after the valve has moved a predetermined distance.

3. In a carbureter, a plurality of fuel inlets, an air inlet, a valve for simultaneously varying the number of effective fuel inlets and the size of the air inlet, an auxiliary fuel inlet for starting purposes, and a plate over said auxiliary inlet and carried by said valve, said plate having an opening therein normally registering with said inlet.

4. In a carbureter, a carbureting chamber, a cylinder extending therefrom and having a longitudinal opening therein, a longitudinally slotted cylindrical shell disposed in said cylinder and adapted by angular movement to vary the size of said opening, said slot being wider at one end than the other, a series of fuel jets disposed along said opening, and a piston valve in said cylinder for varying the number of effective fuel inlets.

5. In a carbureter, a carbureting chamber, a cylinder extending therefrom and having a longitudinal opening therein, a longitudinally slotted shell disposed in said cylinder and adapted by angular movement to vary the size of said opening, said slot having one of its edges oblique to the axis of the cylinder, a series of fuel jets disposed along said opening, and a piston valve in said cylinder for varying the number of effective fuel inlets.

6. In a carbureter, a carbureting chamber, a cylinder extending therefrom and having a longitudinal opening therein, a longitudinally slotted cylindrical shell disposed in said cylinder and adapted by angular movement to vary the size of said opening, said slot being wider at one end than the other, a series of fuel jets disposed along said opening, a piston valve in said cylinder for varying the number of effective fuel inlets, an auxiliary fuel inlet, and means for closing said auxiliary inlet after the piston valve has moved a predetermined distance.

In witness whereof, I hereunto subscribe my name this 5th day of December, A. D. 1911.

WILLIS G. FINCH.

Witnesses:
ARTHUR H. BOETTCHER,
ALBERT G. McCALEB.